(12) United States Patent
Mortimer

(10) Patent No.: US 11,396,447 B1
(45) Date of Patent: Jul. 26, 2022

(54) MEDICATION FILLING ASSEMBLY

(71) Applicant: Express Scripts Strategic Development, Inc., St. Louis, MO (US)

(72) Inventor: Craig F. Mortimer, Casa Grande, AZ (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 0 days.

(21) Appl. No.: 16/995,389

(22) Filed: Aug. 17, 2020

(51) Int. Cl.
*B67D 7/32* (2010.01)
*B67D 7/02* (2010.01)
*B65B 5/10* (2006.01)
*A61J 7/00* (2006.01)
*B67D 7/78* (2010.01)

(52) U.S. Cl.
CPC .......... *B67D 7/3245* (2013.01); *A61J 7/0084* (2013.01); *B65B 5/103* (2013.01); *B67D 7/0288* (2013.01); *B67D 7/78* (2013.01)

(58) Field of Classification Search
CPC ...... B67D 7/0288; B67D 7/78; B67D 7/3245; B65B 5/103; A61J 7/0084
USPC ........... 221/92, 101, 174; 141/100, 103, 104
See application file for complete search history.

(56) References Cited

U.S. PATENT DOCUMENTS

| | | | | |
|---|---|---|---|---|
| 4,111,332 A * | 9/1978 | Hurst | ...................... | B65B 57/20 221/125 |
| 4,171,065 A * | 10/1979 | Hurst | ........................ | G07F 9/02 221/7 |
| 5,348,061 A * | 9/1994 | Riley | ...................... | B65B 5/103 141/104 |
| 5,660,305 A * | 8/1997 | Lasher | .................. | A61J 7/0084 221/124 |
| 5,720,154 A * | 2/1998 | Lasher | .................. | G16H 20/13 53/411 |
| 6,776,304 B2 * | 8/2004 | Liff | ...................... | G06Q 10/087 221/2 |
| 7,124,791 B2 * | 10/2006 | Geltser | .................. | B65B 5/103 141/104 |
| 7,263,411 B2 * | 8/2007 | Shows | .................... | G07F 9/026 700/237 |
| 8,220,224 B2 * | 7/2012 | Ishiwatari | ............... | G07F 11/42 53/52 |
| 8,315,498 B2 | 11/2012 | Redmann | | |
| 8,526,774 B2 | 9/2013 | Krampotich | | |
| 9,042,111 B2 | 5/2015 | Urquhart | | |
| 9,299,210 B2 * | 3/2016 | Parrish | ................ | G07F 17/0092 |
| 9,620,265 B2 | 4/2017 | Peterson | | |
| 9,697,335 B2 * | 7/2017 | Joplin | ................. | G07F 17/0092 |

(Continued)

*Primary Examiner* — Timothy L Maust
(74) *Attorney, Agent, or Firm* — Dickinson Wright PLLC

(57) ABSTRACT

In an embodiment, a medication dispensing assembly includes a housing containing a plurality of electronically activated guidance devices which are configured to guide medications from at least one medication dispenser into a plurality of containers. The housing includes a panel which closes off at least a portion of one side of the housing. The panel has a plurality of wire openings that are spaced apart from one another. A plurality of wires extend through a portion of an interior of the housing and extend through the wire openings of the panel from the interior of the housing to outside of the housing. The wires are electronically connected with electronically activated guidance devices. At least one of the wire openings includes a slot which extends to an edge of the panel.

20 Claims, 9 Drawing Sheets

(56) References Cited

U.S. PATENT DOCUMENTS

| | | |
|---|---|---|
| 9,717,654 B2 | 8/2017 | Dickie |
| 10,303,854 B2 * | 5/2019 | Joplin .................... G16H 20/13 |
| 10,304,562 B2 | 5/2019 | Turnell |
| 10,632,046 B2 | 4/2020 | Ahmadi |
| 10,737,863 B2 | 8/2020 | Kim |
| 10,777,310 B2 * | 9/2020 | Joplin .................... G16H 20/10 |
| 10,998,094 B1 * | 5/2021 | Chiu .................... G07F 17/0092 |
| 2008/0122329 A1 | 5/2008 | Adrian |
| 2018/0174673 A1 | 6/2018 | Defrank |
| 2019/0326006 A1 | 10/2019 | Arric |
| 2019/0336265 A1 | 11/2019 | Batiste |
| 2020/0170890 A1 | 6/2020 | Park |
| 2020/0346830 A1 | 11/2020 | Kim |

* cited by examiner

MEDICATION FILLING ASSEMBLY

BACKGROUND OF THE INVENTION

1. Field of the Invention

The present invention is related generally to medication filling assemblies and is more particularly related to a panel for a housing which is part of a medication filling assembly and which allows for easier access or maintenance.

2. Related Art

Many high volume pharmacies include one or more automatic dispensing systems which are configured to automatically dispense medications into respective containers, such as bottles. One type of such a dispensing system includes a medication guiding elements for directing the medications from respective cells that contain the medications into the containers. Any down time due to maintenance may reduce the throughput of the dispensing system, and therefore, there is a significant and continuing need to minimize maintenance time.

SUMMARY OF THE INVENTION AND ADVANTAGES

In an embodiment, a medication dispensing assembly includes a housing containing a plurality of electronically activated guidance devices which are configured to guide medications from at least one medication dispenser into a plurality of containers. The housing includes a panel which closes off at least a portion of one side of the housing. The panel has a plurality of wire openings that are spaced apart from one another. A plurality of wires extend through a portion of an interior of the housing and extend through the wire openings of the panel from the interior of the housing to outside of the housing. The wires are electronically connected with electronically activated guidance devices. At least one of the wire openings includes a slot which extends to an edge of the panel.

In an embodiment, at least one of the electronically activated guidance devices includes a servo motor and a gate which can close to restrict the passage of medications through the housing and open to allow the passage of medications through the housing.

In an embodiment, each of the wire openings has a keyhole shape with a circular portion and a slot which extends to the edge of the panel.

In an embodiment, the panel includes at least one cutout for allowing access to one or more components within the housing. In an embodiment, the plurality of wires extending through the portion of the interior of the housing are partially bundled together in a conduit.

In an embodiment, the medication dispensing assembly further includes a plurality of guiding members which separate a portion of the interior of the housing into a plurality of chutes that extend from a plurality of openings for receiving the medications from the medication dispensers and for guiding the medications into the containers and wherein the electronically activated guidance devices are disposed in the chutes.

In an embodiment, the housing has the form of a door hanging on a horizontal track to slide laterally from beneath the medication dispenser.

In an embodiment, a medication dispenser assembly including a filling cabinet and a prefill assembly is provided. The filling cabinet has a plurality of cells which contain medications. A plurality of the cells include at least one medication dispenser. The prefill assembly is located adjacent the filling cabinet and is configured to guide the medications from the medication dispensers to a plurality of containers. A container management system is located below the prefill assembly and is configured to position containers such that the medications from the prefill assembly can fall under the influence of gravity through the prefill assembly into the containers. The prefill assembly includes a plurality of doors. Each of the doors includes a plurality of electronic components for controlling the movement of the medications from the filling cabinet to the container management system. Each door includes a panel which covers at least one side of the door. The panel includes at least one wire opening through which at least one wire extends from inside of the door to outside of the door to connect with at least one of the electronic components outside of the door.

In an embodiment, the at least one wire is a plurality of wires which extend along a length inside of the door and wherein the at least one wire opening in the panel is further defined as a plurality of wire openings with at least one of the wires extending through each wire opening.

In an embodiment, at least one of the wire openings includes a slot which is open at an edge of the panel.

In an embodiment, each of the wire openings has a keyhole shape with a circular portion and a slot which extends to the edge of the panel.

In an embodiment, the panel includes at least one cutout for allowing access to one or more components within the housing.

In an embodiment, at least one of the doors can be moved away from the filling cabinet.

In an embodiment, the prefill assembly includes a plurality of the doors.

In an embodiment, a medication dispensing assembly includes a prefill assembly for directing medications from a plurality of medication dispensers into a plurality of containers. The prefill assembly includes at least one door with an interior and with a panel which closes off at least a portion of one side of the interior. The at least one door includes a plurality of guiding members which separate the interior into a plurality of chutes that extend vertically downwardly towards a bottom of the door. A plurality of the chutes include electronically activated gates that can selectively close to restrict the passage of medications through the respective chutes or open to allow the passage of medications through the chutes from the medication dispensers to the containers. A plurality of wires extend through at least a portion of one of the chutes. The wires extend out of the interior of the door through respective wire openings in the panel and are electronically connected with the electronically activated gates.

In an embodiment, the plurality of wires extending through at least a portion of the chute are bundled together in a conduit.

In an embodiment, at least one of the wire openings includes a slot which extends to an edge of the panel.

In an embodiment, each of the wire openings has a keyhole shape with a circular portion and a lot which extends to the edge of the panel.

In an embodiment, the panel includes at least one cutout for allowing access to one or more components within the housing.

BRIEF DESCRIPTION OF THE DRAWINGS

These and other features and advantages of the invention will become more readily appreciated when considered in connection with the following description of the presently preferred embodiments, appended claims and accompanying drawings, in which:

DESCRIPTION OF THE ENABLING EMBODIMENT

Figure 1:
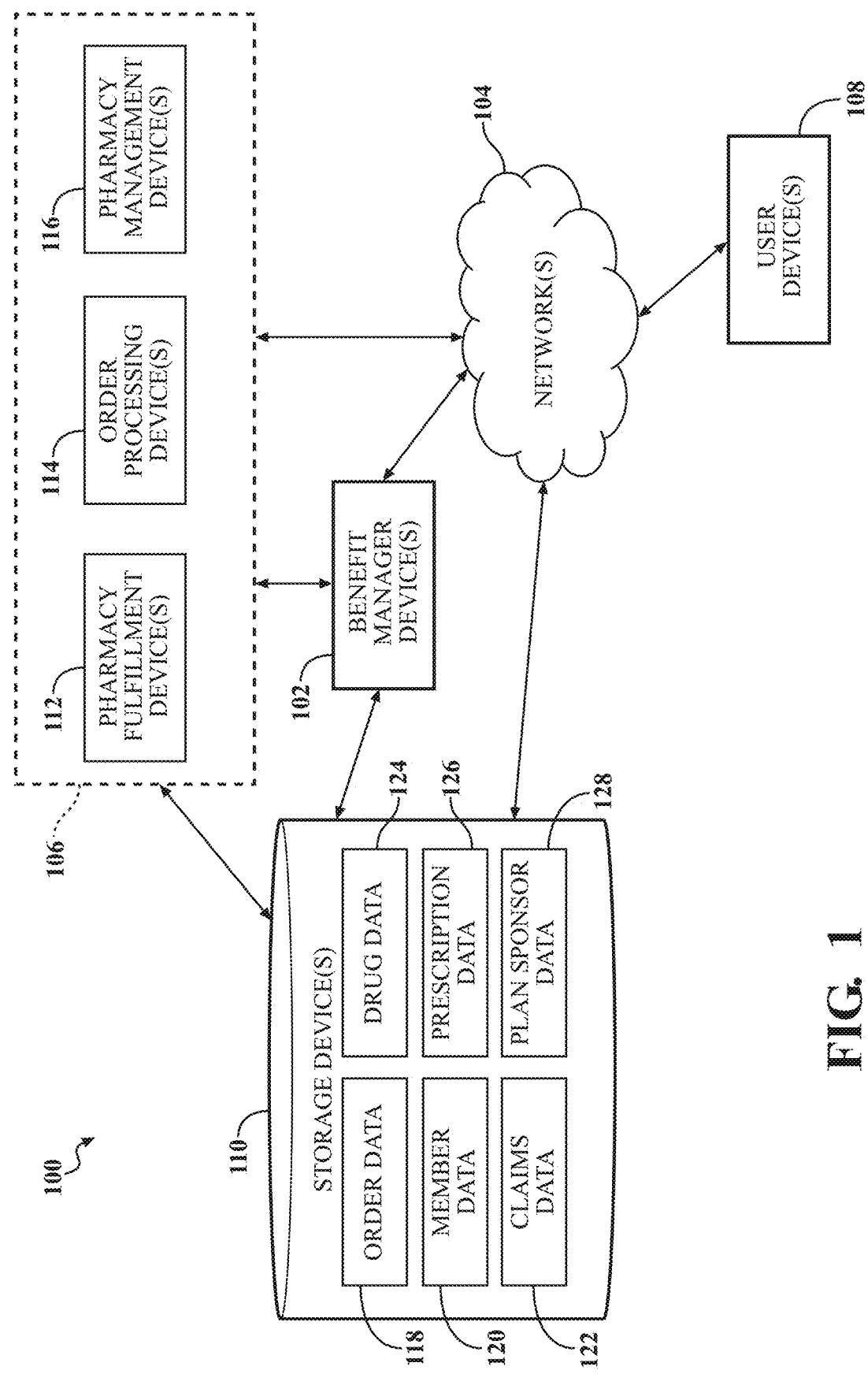
FIG. 1 is a block diagram of an example system according to an example embodiment.

FIG. 1 is a block diagram of an example implementation of a system 100, according to an example embodiment. While the system 100 is generally described as being deployed in a high volume pharmacy or fulfillment center (e.g., a mail order pharmacy, a direct delivery pharmacy, an automated pharmacy, multiple package delivering center, and the like), the system 100 and/or components thereof may otherwise be deployed (e.g., in a lower volume pharmacy or another dispenser of large numbers of small items). A high volume pharmacy may be a pharmacy that is capable of filling prescriptions automatically, mechanically, manually, or a combination thereof. The system 100 may include a benefit manager device 102, a pharmacy device 106, and a user device 108, which may communicate with each other directly and/or over a network 104. The system may also include a storage device 110.

The benefit manager 102 is a device operated by an entity that is at least partially responsible for creation and/or management of the pharmacy or drug benefit. While such an entity operating the benefit manager device 102 is typically a pharmacy benefit manager (PBM), other entities may operate the benefit manager device 102 either on behalf of themselves, the PBM, another entity, or other entities. For example, the benefit manager device 102 may be operated by a health plan, a retail pharmacy chain, a drug wholesaler, a data analytics or other type of software-related company, or the like. In some embodiments, a PBM that provides the pharmacy benefit may also provide one or more than one additional benefits including a medical or health benefit, a dental benefit, a vision benefit, a wellness benefit, a radiology benefit, a pet care benefit, an insurance benefit, a long term care benefit, a nursing home benefit, and the like. The PBM may, in addition to its PBM operations, operate one or more than one pharmacy.

Some of the operations of the PBM that operates the benefit manager device 102 may include the following activities and processes. A member (or a person on behalf of the member) of a pharmacy benefit plan administered by or through the PBM attempts to obtain a prescription drug at a retail pharmacy location (e.g., a location of a physical store) from a pharmacist or a pharmacist technician. The member may also attempt to obtain the prescription drug through mail order drug delivery, from a mail order pharmacy location, which may be the high volume pharmacy system 100. In some embodiments, the member may also attempt to obtain the prescription drug directly or indirectly through the use of a machine, such as a kiosk, vending unit, mobile electronic device, or a different type of mechanical electrical, electronic communication device, and/or computing device. Such a machine may be filled with the prescription drug in prescription packaging, which may include multiple prescription components, prepared by the high volume pharmacy system 100.

The member may have a copayment for the prescription drug that reflects an amount of money that the member is responsible to pay the pharmacy for the prescription drug. The money paid by the member to the pharmacy may come from personal funds of the member, a health savings account (HSA) of the member or the member's family, a health reimbursement arrangement (HRA) of the member or the member's family, a flexible spending account (FSA) of the member or the member's family, or the like. In some instances, an employer of the member may directly or indirectly fund or reimburse the member for the copayments.

The amount of the co-pay required form the member may vary with different pharmacy benefit plans having different plan sponsors or clients and/or prescription drugs. The member's copayment may be based on a flat copayment (e.g., $10), co-insurance (e.g., 10%), and/or a deductible (e.g., for first $500 of annual prescription drug expenses) for certain prescription drugs, certain types and/or classes of prescription drugs, and/or all prescription drugs. The copayment may be stored in the storage 110 or determined by the benefit manager device 102.

In some instances, the member may not pay the copayment or may only pay a portion of the copayment for the prescription drug. For example, if the usual and customary cost for a generic version of a prescription drug is $4, and the member's flat copayment is $20 for the prescription drug, the member may only be required to pay $4 to receive the prescription drug. In another example involving a worker's compensation claim, no copayment may be due by the member for the prescription drug.

In addition, copayments may also vary based on different delivery channels used for the prescription drug to be received by the member. For example, the copayment for receiving the prescription drug from a mail order pharmacy location may be less than the copayment for receiving the prescription drug from a retail pharmacy location.

In conjunction with receiving the copayment (if any) from the member and dispensing the prescription drug to the member, the pharmacy submits a claim to the PBM for the prescription drug. After receiving the PBM (e.g., through the benefit manager device 102) may perform certain adjudication operations including verifying eligibility for the member, identifying and/or reviewing an applicable formulary for the member to determine any appropriate copayment, coinsurance, and deductible for the prescription drug, and performing a drug utilization review (DUR) on the member. The PBM provides a response to the pharmacy (e.g., from the benefit manager device 102 to the pharmacy device 106) following performance of at least some of the operations mentioned herein.

As part of the adjudication, a plan sponsor (or the PBM on behalf of the plan sponsor) ultimately reimburses the pharmacy for filling the prescription drug when the prescription drug was successfully adjudicated.

The aforementioned adjudication operations generally occur before the copayment is received and the prescription drug is dispensed. However, in some instances these operations may occur simultaneously, substantially simultaneously, or in a different order. In addition, more or less adjudication operations may be performed as at least part of the adjudication process.

The amount of reimbursement paid to the pharmacy by a plan sponsor and/or money paid by the member may be determined at least partially based on the type(s) of pharmacy network in which the pharmacy is included. Other factors may also be used to determine the amount in addition to the type of pharmacy network. For example, if the member pays the pharmacy for the prescription drug without the prescription drug benefit provided by the PBM (e.g., by paying cash without use of the prescription drug benefit or by use of a so-called pharmacy discount card offering other negotiated rates), the amount of money paid by the member may be different than when the member uses prescription or drug benefit. In some embodiments, the amount of money received by the pharmacy for dispensing the prescription drug and for the prescription drug itself may be higher than when the member uses the prescription or drug benefit. Some or all of the foregoing operations may be performed by executing instructions stored on the benefit manager device 102 and/or an additional device.

Examples of the network 104 include Mobile Communications (GSM) network, a code division multiple access (CDMA) network, $3^{rd}$ Generation Partnership Project (3GPP) network, an Internet Protocol (IP) network, a Wireless Application Protocol (WAP) network, a WiFi network, or an IEEE 802.11 standards network, as well as various combinations thereof. The network 104 may include an optical communication network. The network 104 may be a local area network or a global communication network, such as the Internet. In some embodiments, the network 104 may include a network dedicated to prescription orders, e.g., a prescribing network such as the electronic prescribing network operated by Surescripts of Arlington, Va.

Moreover, although the system shows a single network 104, multiple networks can be used. The multiple networks may communicate in series with each other to link the devices 102, 106-110 or in parallel to link the devices 102, 106-110.

The pharmacy device 106 may include an order processing device 114, a pharmacy manager device 116, and a pharmacy fulfillment device 112 in communication with each other directly and/or over the network 104.

The order processing device 114 may receive information regarding filling prescriptions and may direct an order component to one or more than one of the devices of the pharmacy fulfillment device 112 at a pharmacy. The pharmacy fulfillment device 112 may fulfill, dispense, aggregate, and/or pack the order components of the prescription drugs in accordance with one or more than one of the prescription orders directed by the order processing device 114. The order processing device 114 may be deployed in the system 100 or may otherwise be used. The pharmacy fulfillment device 112 may include an item dispenser that includes a door as described herein. The door may include devices to stage groups of items, e.g., medication, small solids, or the like, for dispensing into an appropriate container. The containers can be tracked in the pharmacy fulfillment device 112 and/or the order processing device 114. The door may include apertures, openings or slots through which power lines can extend from inside the door to outside the door to allow movement of the door and maintenance of the door without completely disconnecting all bundled lines in the door.

In general, the order processing device 114 is a device located within or otherwise associated with the pharmacy to enable fulfillment of a prescription and dispensing prescription drugs by the pharmacy fulfilment device 112. In some embodiments, the order processing device 114 may be an external device separate from the pharmacy and communicate with other devices located within the pharmacy.

For example, the external order processing device 114 may communicate with an internal order processing device 114 and/or other devices located within the system 100. In some embodiments, the external order processing device 114 may have limited functionality (e.g., as operated by a patient requesting fulfillment of a prescription drug), while the internal pharmacy order processing device 114 may have greater functionality (e.g., as operated by a pharmacist).

The order processing device 114 may track the prescription order as it is fulfilled by the pharmacy fulfillment device 112. The prescription order may include one or more than one prescription drugs to be filled by the pharmacy. The order processing device 114 may make pharmacy routing decisions and/or order consolidation decisions for the particular prescription order. The pharmacy routing decisions may include what device(s) in the pharmacy are responsible for filling or otherwise handling certain portions of the prescription order. The order consolidation decisions include whether portions of one prescription order or multiple prescription orders should be shipped together for a patient or a patient family. The order processing device 114 may also track and/or schedule literature or paperwork associated with each prescription order or multiple prescription orders that are being shipped together.

The pharmacy management device 116 may enable and/or facilitate management and operations in a pharmacy. For example, the pharmacy management device 116 may provide functionality to enable receipt and processing of prescription drug claims, management of pharmacy personnel, management of pharmaceutical and non-pharmaceutical products, track products in the pharmacy, record workplace incidents involve personnel and products, and the like. In some embodiments, the order processing device 114 may operate in combination with the pharmacy management device 116.

In some embodiments, the pharmacy management device 116 may be a device associated with a retail pharmacy location (e.g., exclusive pharmacy location, a grocery store with a retail pharmacy, or a general sales store with a retail pharmacy) or other type of pharmacy location at which a member attempts to obtain a prescription. The pharmacy management device 116 may be utilized by the pharmacy to submit the claim to the PBM (e.g., through the benefit management device 102) for adjudication.

In some embodiments, the pharmacy management device 116 may enable information exchange between the pharmacy and the PBM, for example, to allow the sharing of member information such as drug history, and the like, that may allow the pharmacy to better service a member (e.g., by providing more informed therapy consultation and drug interaction information, etc.). In some embodiments, the benefit manager 102 may track prescription drug fulfillment and/or other information for patients that are not members or have not identified themselves as members, at the time (or in conjunction with the time) in which they seek to have a prescription filled at a pharmacy.

The pharmacy fulfillment devices 112, the order processing device 114, and/or the pharmacy management device 116 may include circuitry, a processor, a memory to store data and instructions, and communication functionality. These devices 112-116, in some embodiments are dedicated to performing processes, methods and/or instructions described herein. Other types of electronic devices specifically configured to implement with the processes, methods and/or instructions described herein may also be used.

In some embodiments, at least some functionality of the order processing device 114 may be included in the pharmacy management device 116 may include circuitry, a processor, a memory to store data and instructions, and communication functionality. These devices 112-116, in some embodiments, are dedicated to performing processes, methods and/or instructions described herein. Other types of electronic devices specifically configured to implement with the processes, methods and/or instructions described herein may also be used.

In some embodiments, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (e.g., by utilizing a local storage) and/or through the network 104 (e.g., by utilizing a cloud configuration or software as a service, etc.) with the storage 110.

The user device 108 is used by a device operator. The device operator may be a user (e.g., an employee, a contractor, a benefit member, a patient of the pharmacy, or the like) associated with the system 100. Other device operators may also operate the user device 108. In some embodiments, the user device 108 may enable the device operator to attend to pharmacy operations in a convenient manner (e.g., remote from a pharmacy). In some embodiments, the user device 108 may enable the device operator to receive information about pharmacy processes, prescription drug fulfillment status, and the like.

The user device 108 may be a stand-alone device that solely provides at least some of the functionality of the methods and systems or may be a multi-use device that has functionality outside off analysis of the methods and systems. In some embodiments, the computing system may include a mobile computing device. For example, the user device 108 may include a mobile electronic device, such as an iPhone or iPad by Apple, Inc., and mobile electronic devices powered by Android by Google, Inc. The user device 108 may also include other computing devices, such as desktop computing devices, notebook computing devices, netbook computing devices, gaming devices, and the like. Other types of electronic devices may also be used. The user device 108 running an application becomes a dedicated device when executing the application.

The storage device 110 may include: a non-transitory storage (e.g., memory, hard disk, CD-ROM, and the like) in communication with the benefit manager device 102, the pharmacy device 106, and/or the user device 108 directly and/or over the network 104. The non-transitory storage may store order data 118, member 120, claims data 122, drug data 124, prescription data 126, and/or plan sponsor 128. Further, the system 100 may include additional devices, which may communicate with each other directly or over the network 104.

The order data 118 may be related to a prescription order. The order data may include the type of the prescription drug (e.g., drug name and strength) and quantity of the prescription drug. The order data 118 may also include data used for completion of the prescription, such as prescription materials and/or the type and/or size of container in which the drug is dispensed or in which is requested to be dispensed. In general, prescription materials include an electronic copy of information regarding the prescription drug for inclusion with or otherwise provided (e.g., via email) in conjunction with the fulfilled prescription. The prescription materials may include electronic information regarding drug interaction warnings, recommended usage possible side effects, expiration date, date of prescribing, or the like. The order data 118 may be used by the pharmacy to fulfill a pharmacy order.

In some embodiments, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (e.g., a prescription bottle and sealing lid, prescription packaging, and the like) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information, such as bar code data read from pallets, bins, trays, carts, and the like used to facilitate transportation of prescriptions within the pharmacy may also be stored as order data 118.

The member data 120 includes information regarding the members associated with the PBM. The information stored as member data 120 may include personal information, personal health information, protected health information, fitness data, health data, web and mobile app activity, and the like. Examples of the member data 120 include name, address, telephone number, e-mail address, prescription drug history, and the like. The member data 120 may include a plan sponsor identifier that identifies the plan sponsor associated with the member and/or a member identifier that identifies the member to the plan sponsor. The member data 120 may also include, by way of example, dispensation preferences such as type of label, type of cap, message preferences, language preferences, or the like.

The member data 120 may be accessed by various devices in the pharmacy to obtain information utilized for fulfillment and shipping of prescription orders. In some embodiments, an external order processing device 114 operated by or on behalf of a member may have access to at least a portion of the member data 120 for review, verification, or other purposes.

In some embodiments, the member data 120 may include information for persons who are patients of the pharmacy but are not members in a pharmacy benefit plan being provided by the PBM. For example, these patients may obtain drugs directly from the pharmacy, through a private label service offered by the pharmacy, or otherwise. In general, the use of the terms member (e.g., of a prescription drug benefit plan) and patient (e.g., of a pharmacy) may be used interchangeably in this disclosure.

The claims data 122 includes information regarding pharmacy claims adjusted by the PBM under a drug benefit program provided by the PBM for one, or more than one, plan sponsor. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number), the dispensing date, generic indicator, GPI number, medication class, the cost of the prescription drug provided under the drug benefit program, the copay/coinsurance amount, rebate information, and/or member eligibility, and the like. Additional information may be included.

In some embodiments, other types of claims beyond prescription drug claims may be stored in the claims data 122. For example, medical claims, dental claims, wellness claims, or other types of health care-related claims for members may be stored as a portion of the claims data.

In some embodiments, the claims data 122 includes claims that identify the members with whom the claims are associated. In some embodiments, the claims data 122 includes claims that have been de-identified (e.g., associated with a unique identifier but not with a particular, identifiable member), aggregated, and/or otherwise processed.

The drug data 124 may include drug name (e.g., technical name and/or common name), other names by which the drug is known by, active ingredients, an image of the drug (e.g., in pill form), and the like. The drug data 124 may include information associated with a single medication or multiple medications.

The prescription data 126 may include information regarding prescriptions that may be issued by prescribers on behalf of patients, who may be members of the pharmacy benefit plan, for example to be filled by a pharmacy. Examples of the prescription data 126 include patient names, medication or treatment (such as lab tests), dosing information, and the like. The prescriptions may be electronic prescriptions, paper prescriptions that have been scanned, or otherwise. In some embodiments, the dosing information reflects a frequency of use (e.g., once a day, twice a day, before each meal, etc.) and a duration of use (e.g., a few days, a week, a few weeks, a month, etc.).

In some embodiments, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, and the like.

Figure 2:
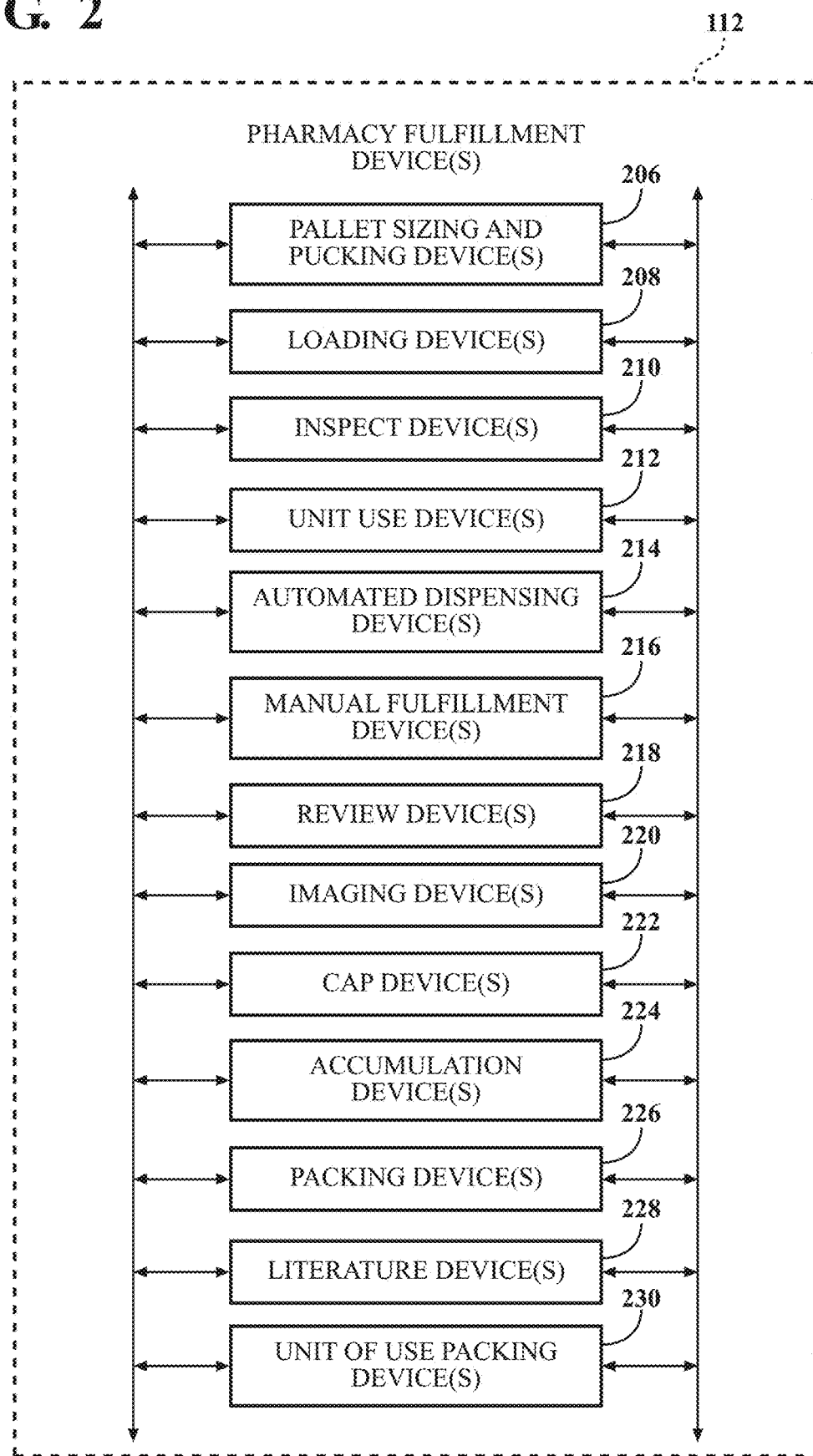
FIG. 2 is a block diagram of an example order processing device that may be deployed within the system of FIG. 1.

FIG. 2 illustrates the pharmacy fulfillment device 112, according to an example embodiment. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device, the order processing device 114, and/or the non-transitory storage 110, directly or over the network 104. Specifically, the pharmacy fulfillment device 112 may include pallet sizing and pucking device(s); loading device(s) 208; inspect device(s) 210, unit of use device(s) 212, automated dispensing device(s) 214, manual fulfillment device(s) 216, review device(s) 218, imaging device(s) 220, cap device(s) 222, accumulation device(s) 224, literature device(s) 228, packing device(s) 226, and unit of use packing device(s) 230. Further, the pharmacy fulfillment device 112 may include additional devices, which may communicate with each other directly or over the network 104.

In some embodiments, operations performed by one or more of these devices 206-230 may be performed sequentially, or in parallel with the operations of devices as may be coordinated by the order processing device 114. In some embodiments, the order processing device 114 tracks a prescription with the pharmacy based on operations performed by one or more than one of the devices 206-230.

In some embodiments, the pharmacy fulfillment device 112 may transport prescription drug containers, for example, between more than one of the devices 206-230 in a high volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism, or the like. In one embodiment, the loading device 208 has robotic arms or pickers to grasp a prescription container and move it to and from a pallet or to and from a puck. The loading device may also print a label that is appropriate for a container that is to be loaded onto the pallet and apply the label to the container. The pallet may be located on a conveyor assembly during these operations (e.g., at the high volume fulfillment center or the like).

The inspect device 210 may verify that containers in a pallet are correctly labeled and in the correct spot on the pallet. The inspect device 210 may scan the label on one or more than one container on the pallet. Labels of containers may be scanned or imaged in full or in part by the inspect device 210. Such imaging may occur after the container has been lifted out of its puck by a robotic arm, picker, or the like, or may be otherwise scanned or imaged while retained in the puck. In some embodiments, images and/or video captured by the inspect device may be stored in the storage device as a portion of the order data 118.

The unit of use device 212 may temporarily store, monitor, label, and/or dispense unit of use products. In general, unit of use products are prescription drug products that may be delivered to a patient or member without being repackaged at the pharmacy. These products may include pills in a container, pills in a blister pack, inhalers, liquids in a spray or other dispensing container, and the like. Prescription drug products dispensed by the unit of use device 212 may be packaged individually or collectively for shipping or may be shipped in combination with other prescription drugs dispensed by other devices (e.g., in the high volume fulfillment center).

At least some of the operations of the devices 206-230 may be directed by the other processing device 114. For example, the manual fulfillment device 216, the review device 218, the automated dispensing device 214, the packing device 226, and/or another device may receive instructions provided by the order processing device.

The automated dispensing device 214 may include one or more than one device that dispenses prescription drugs or pharmaceuticals into prescription containers in accordance with one or multiple prescription orders. In general, the automated dispensing device 214 may include mechanical and electronic components with, in some embodiments, software and/or logic to facilitate pharmaceutical dispensing that would otherwise be performed in a manual fashion by a pharmacist and/or pharmacist technician. For example, the automated dispensing device 214 may include high volume fillers (HVFs) that fill a number of prescription drug types at a rapid rate and blister pack machines that dispense and pack drugs into a blister pack. Prescription drugs dispensed by the automated dispensing devices 214 may be packaged individually or collectively for shipping or may be shipped in combination with other prescription drugs dispensed by other devices in the high volume fulfillment center. The automated dispensing device 214 may include a counter to count medications from a hopper and dispense to a specified container through a dispensing door structure to stage and to guide the drug items to the specified container.

The manual fulfillment device 216 may provide for manual fulfillment of prescriptions. For example, the manual fulfillment device 216 may receive or obtain a container and enable fulfillment of the container by a pharmacist or pharmacy technician. In some embodiments, the manual fulfillment device 216 provides the filled container to another device in the pharmacy fulfillment devices 112 to be joined with other containers in a prescription order for a patient or member. In general, a manual fulfillment may include operations at least partially performed by a pharmacist or a pharmacy technician. For example, a person may retrieve a supply of the prescribed drug, may make an observation, may count out a prescribed quantity of drugs and place them into a prescription container, or the like. Some portions of the manual fulfillment process may be automated by use of a machine. For example, counting of capsules, tablets, or pills may be at least partially automated (e.g., through use of a pill counter or the like). Prescription drugs dispensed by the manual fulfillment device 216 may be packaged individually or collectively for shipping or may be shipped in combination with other prescription drugs dispensed by other devices in the high volume fulfillment center.

The review device 218 may process prescription containers to be reviewed by a pharmacist for proper pill count, exception handling, prescription verification, and the like. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been cancelled, containers with defects, and the like. In an example embodiment, the manual review may be performed at the manual station.

The imaging device 220 may image containers prior to filling and/or after they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114, and/or stored in the storage device 110 as part of the order data 118.

The cap device 222 may be used to cap or otherwise seal a prescription container. In some embodiments, the cap device 222 may secure a prescription container with a type of cap in accordance with a patient preference (e.g., a preference regarding child resistance, a preference regarding built-in adherence functionality, or the like), a plan sponsor preference, a prescriber preference, or the like. The cap device 222 may also etch a message into the cap or otherwise associate a message into the cap, although this process may be performed by a different device in the high volume fulfillment center.

The accumulation device 224 accumulates various containers of prescription devices in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218, at the high volume fulfillment center. The accumulation device 224 may be used to group the prescription containers prior to shipment to the member or otherwise.

The literature device 228 prints, or otherwise generates, literature to include with prescription drug orders. The literature may be printed on multiple sheets of substrates, such as paper, coated paper, printable polymers, or combinations thereof. The literature printed by the literature device 228 may include information required to accompany the prescription drugs included in a prescription order, relating to prescription drugs in the order, financial information associated with the order (e.g., an invoice or an account statement, or the like).

In some embodiments, the literature device 228 folds or otherwise prepares the literature for inclusion with a prescription drug order (e.g., in a shipping container or the like). In some embodiments, the literature device 228 that prints the literature may be separate from the literature device that prepares the literature for inclusion with a prescription order. The packing device 226 packages a prescription order in preparation for shipping the order. The packing device 226 may box, bag, or otherwise package the fulfilled prescription order for delivery. The packing device 226 may be a wrap seal device. A wrap seal device deployed as the packing device 226 may be a wrap seal device. A wrap seal device deployed as the packing device 226 may pause before an index; during the pause, one or more bottle, envelope or literature items have been placed within a vacuum pocket of the wrap seal device. After any bottle, envelope, or literature items have been placed in the pocket, the wrap seal device may index; specifically, the vacuum pocket may move forward. In an example embodiment, the forward movement is about the length of a bag (for example, between about 16 and 20 inches).

The packing device 226 may further place inserts (e.g., literature or other papers) into the packaging received from the literature device 228 or otherwise. For example, bulk prescription orders may be shipped in a box, while other prescription orders may be shipped in a bag which may be a wrap seal bag. The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, sort by zip code, or the like). The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, sort by zip code, or the like). The packing device 226 may include ice or temperature sensitive elements for prescriptions which are to be kept within a temperature range during shipping in order to retain efficacy or otherwise. The ultimate package may then be shipped through postal mail, through a mail order delivery service that ships via ground and/or air (e.g., UPS®, FedEx®, or DHL®, or the like), through delivery service, through a local delivery service (e.g., a courier service), through a locker box at a shipping site (e.g., an Amazon® locker, library locker, a post office box, or the like) or otherwise.

The unit of use packing device 230 packages a unit of use prescription order in preparation for shipping the order.

The pharmacy fulfillment device 112 in FIG. 2 may include single devices 206-230 or multiple devices 206-230 (e.g., depending upon implementation in a pharmacy). The devices 206-230 may be the same type or model of device or may be different device types or models. When multiple devices are present, the multiple devices may be of the same device type or models or may be a different device type or model. The types of devices 206-230 shown in FIG. 2 are example devices. In other configurations of the system 100, lesser, additional, or different types of devices may be included.

Moreover, multiple devices may share processing and/or memory resources. The devices 206-230 may be located in the same area or in different locations. For example, the devices 206-230 may be located in a building or a set of adjoining buildings. The devices 206-230 may be interconnected (e.g., by conveyors), networked, and/or otherwise in contact with one another or integrated with one another (e.g., at the high volume fulfillment center). In addition, the functionality of a device may be split among a number of discrete devices and/or combined with other devices.

Figure 3:
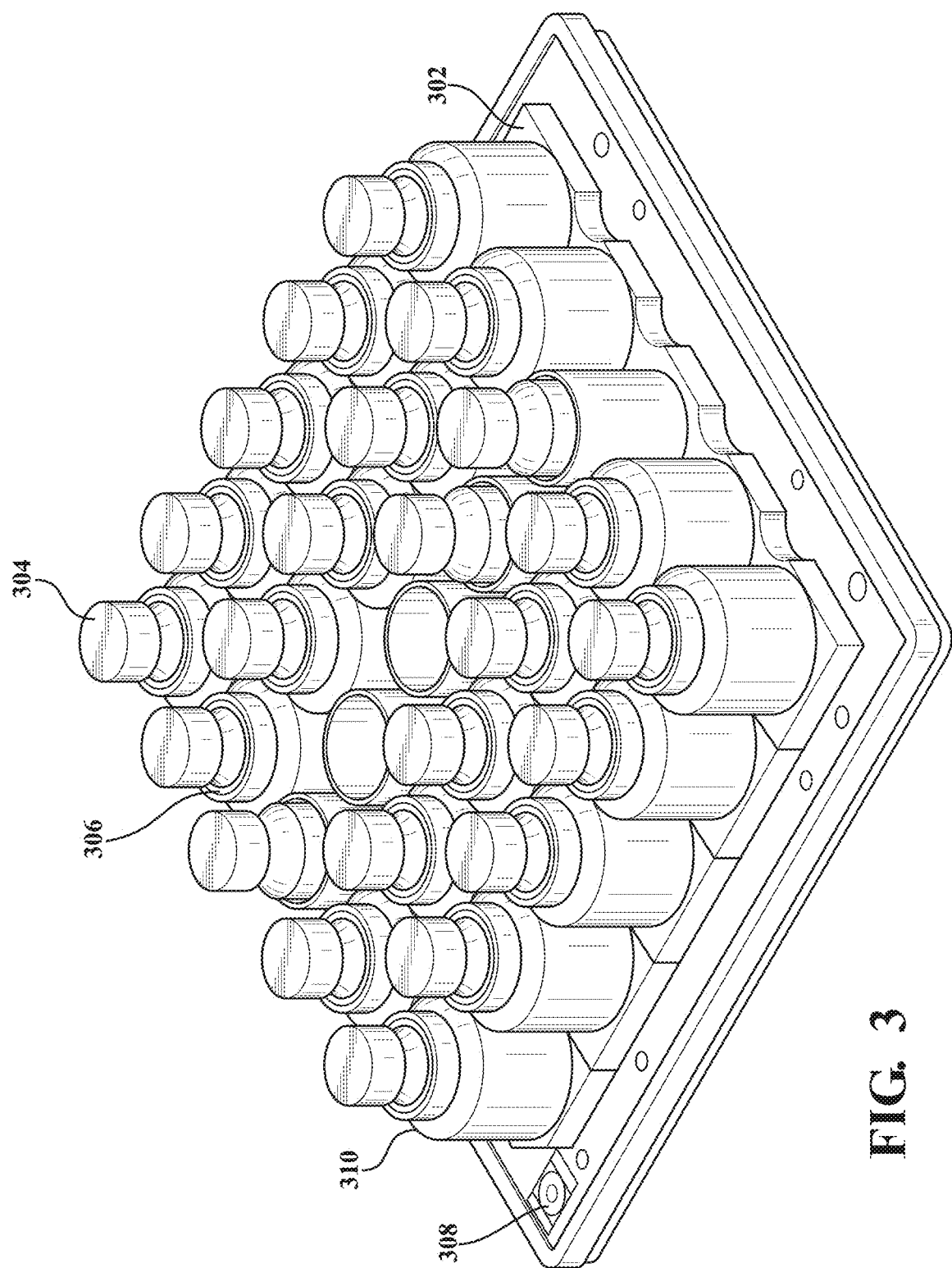
FIG. 3 is a top, perspective view of a pallet that may be deployed within the system of FIG. 1 according to an example embodiment.

FIG. 3 illustrates a pallet 302, according to an example embodiment, which may be used in the pharmacy fulfillment device 112 of the system 100 of FIG. 1. The pallet 302 may be a transport structure for a number of prescription containers 304, and may include a number of cavities 306. While the pallet 302 is shown to include twenty-five cavities in a five by five cavity row/column configuration, other numbers of categories and/or cavity configurations of varying shapes, sizes, and/or dimensions may be used. In some embodiments, the pallet may be substantially square and, in such an embodiment, have a width and length of between approximately 18 inches and 22 inches (e.g., approximately 18 inches, 19 inches, 20 inches, 21 inches, or 22 inches). In some embodiments, the width and/or length may be greater than approximately 22 inches or less than approximately 18 inches. The containers 304 shown in FIG. 3 are shown with caps sealing the open mouth. In use, the pallet moves a specified one of the containers to align the uncapped bottle mouth with a dispenser mouth at the bottom of a door. When aligned, the structures in the door will dispense the staged group of items from the staged area in the door to the aligned one of the containers 304 in the pallet.

In an example embodiment, the cavities 306 are spaced on the pallet 302 such that the center point of adjacent cavities 306 is approximately 3 and 4 inches (e.g., approximately 3 inches, 3.25 inches, 3.5 inches, 3.75 inches, or 4 inches). In another example embodiment, the distance between center points of adjacent cavities 306 is more than approximately 4 inches. In yet another example embodiment, the center points of cavities 306 are less than approximately 3 inches apart.

The pallet 302 may be made in whole or in part of metal, such as aluminum. Other suitable materials may be used for the pallet 302, such as plastic. The pallet 302 may be rigid so that the cavities remain in a known location that can be tracked while the pallet moves through the system 100. The pallet 302 may include bumpers.

In some embodiments, other carriers beyond the pallet and/or no carrier may be used to move containers or groups of containers through the system 100.

The pallet 302 may retain one or more than one container 304. A container 304 is generally cylindrical and may be one or a variety of sizes utilized by a pharmacy for fulfillment of a prescription. For example, a pharmacy may have two different sized containers or three different sized containers. Any number of different sized containers may be used with the pallet 302. While the container 304 is generally denoted as being used with the pallet 302, the containers 304 may otherwise be used in the system 100 or in a different system. Shapes beyond cylindrical shapes may be used for the containers 304. Examples of other shapes include regular prisms, elliptical cylinders, and combinations thereof. The receptacle of a puck may be sized to receive and support the outer shape of the container. The containers 304 may be disposed in the pallet 302 such that they are close to one another but do not touch.

The pallet 302 may include a radio-frequency identification (RFID) tag 308. The RFID tag 308 may be an active RFID tag, such as an active RFID tag with a close reading range. In some embodiments, the RFID tag 308 is an active, narrowband, read/write RFID tag.

The RFID tag 308 of a particular pallet 302 may store data (or otherwise facilitate the access of data, e.g., from the database 108) associated with the containers 304 that have been, are, and/or will be placed within the pallet 302, such as the order data, the claims data, the drug data, the prescription data, and/or the plan sponsor data associated with such containers. Other data may be stored by and/or associated with the RFID tag 314, such as the age of the pallet 302, the number of times the pallet 302 has been used to transport containers 304 through the system 100, the number of errors associated with the pallet 302, and the like. The RFID tag 314 may also store the position of individual containers on the pallet 302. In an example embodiment, the RFID tag 308 of the pallet 302, while deployed within an automated dispensing device 212, stores data associated with one or more of the following data fields: (1) container identifiers, (2) identifier of the particular automated dispensing device 212, (3) identifiers of the particular cells from which a particular container will be filled (as described below), (4) container properties (e.g., the status of containers 304 on the pallet, such as whether the containers 304 have passed an inspection station and have been identified as containers 304 to be filled in the particular automated dispensing device 212), and (5) the pallet route within the automated dispensing device 212.

The pucks 310 may be used to modify the size of the cavities 306 to allow the pallet 302 to accommodate different sizes of the containers 304.

Figure 4:
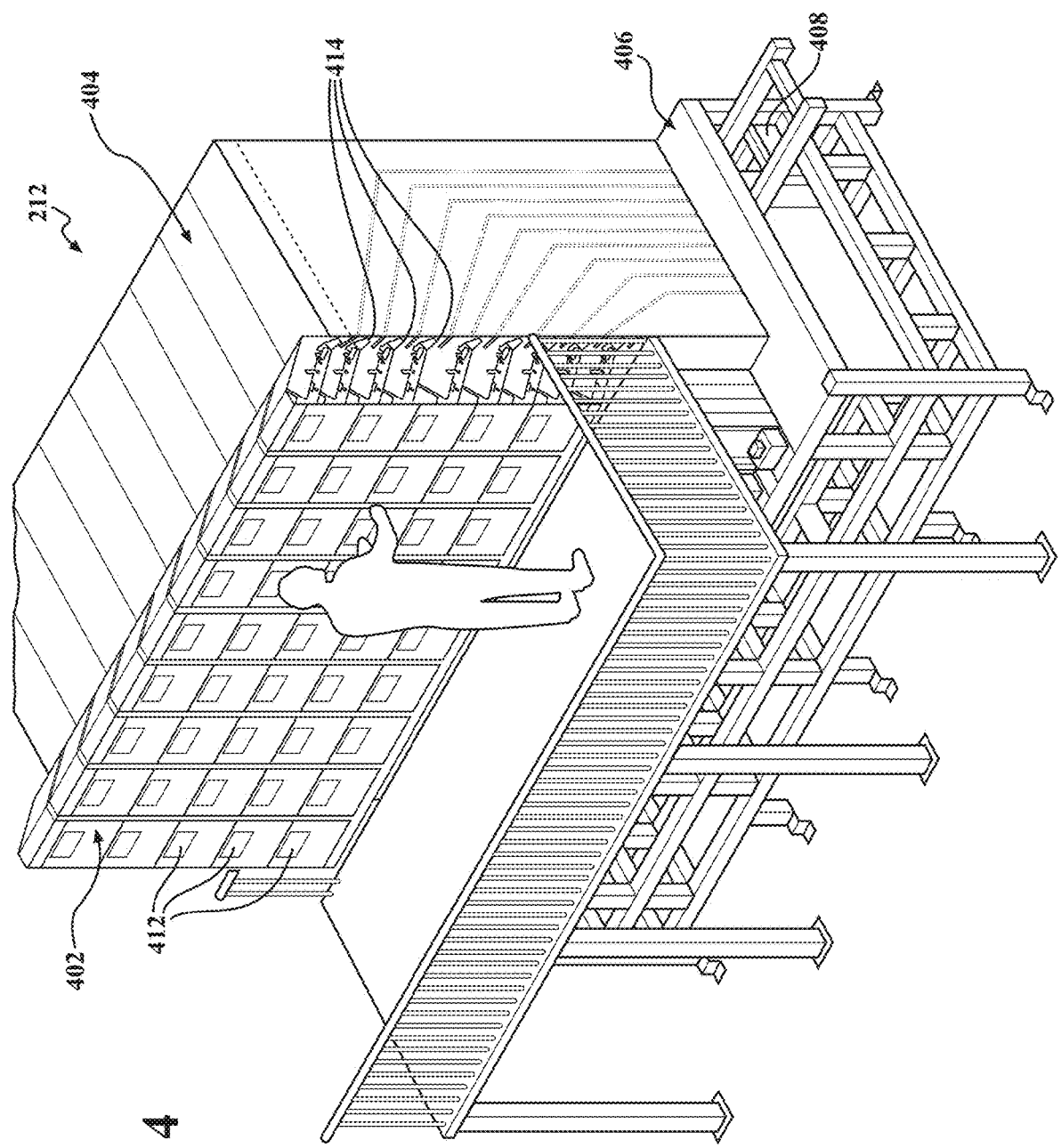
FIG. 4 is a perspective view of an automated dispensing device that may be deployed within the system of FIG. 1 according to an example embodiment.
Figure 5:
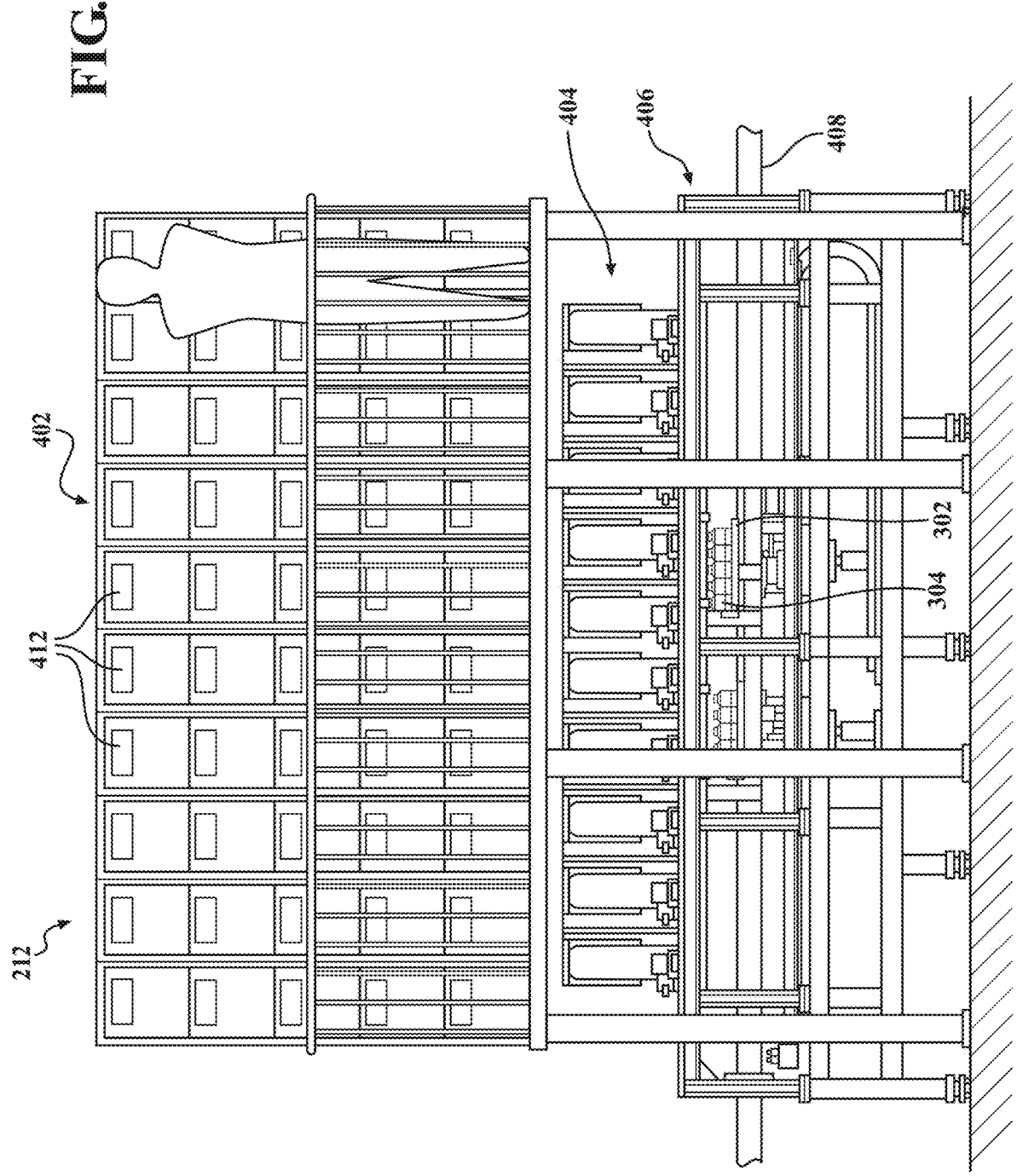
FIG. 5 is a side elevation view of the automated dispensing device of FIG. 4.
Figure 6:
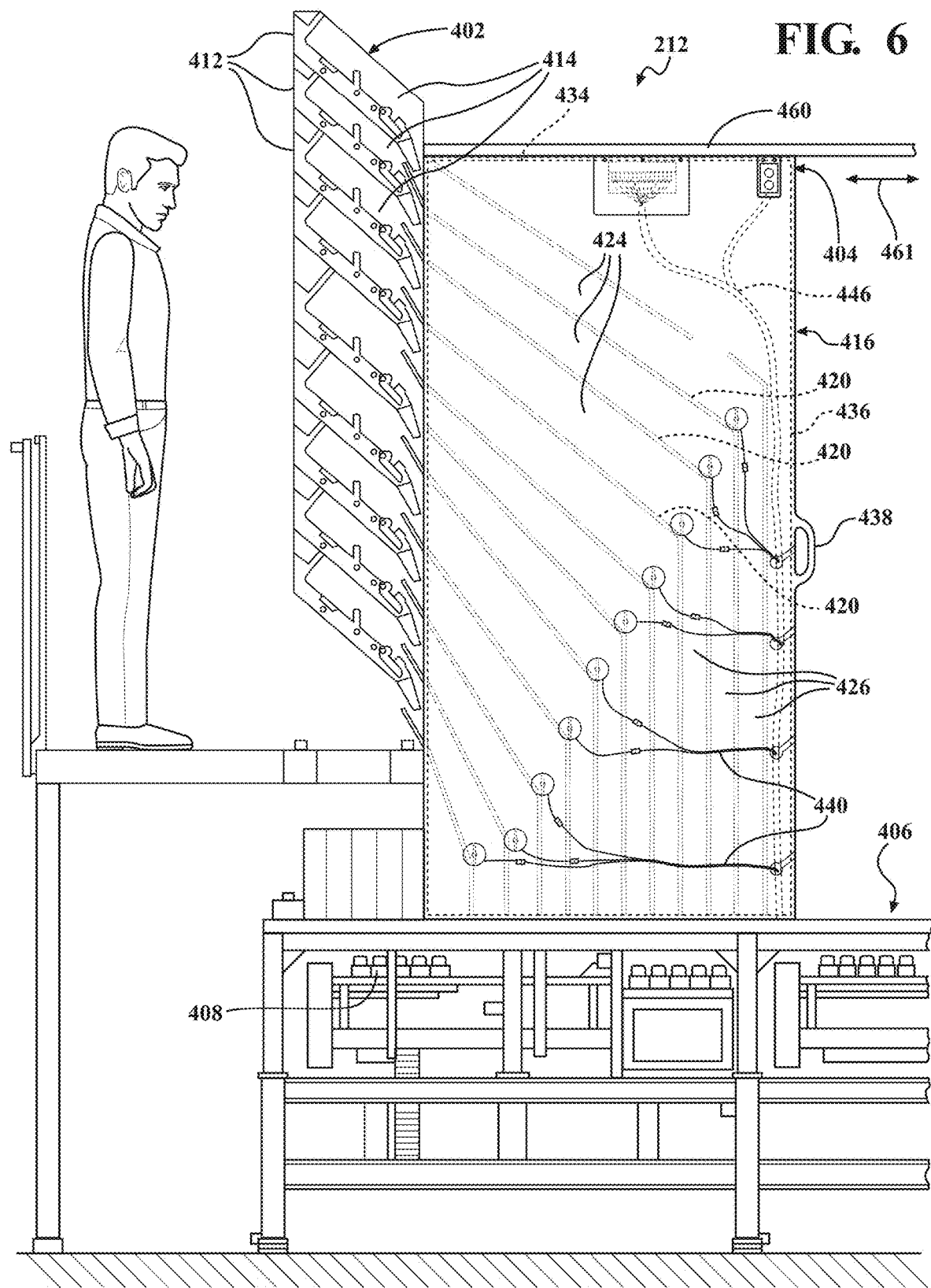
FIG. 6 is a front elevation view of the automated dispensing device of FIG. 4.

FIGS. 4-6 illustrate the automated dispensing device 212, according to an example embodiment. The automated dispensing device 212 enables dispensing of a number of different types of pharmaceuticals in an automated or semi-automatic manner. The automated dispensing device 212 includes a filling cabinet 402, a prefill assembly 404, and a pallet system 406 which includes a pallet conveyor 408. The filling cabinet 402 stores pharmaceuticals to be dispensed into containers via the prefill assembly 404 and dispenses measured quantities of pharmaceuticals into the prefill assembly 404. The prefill assembly 404 stores the measured quantities of pharmaceuticals 410 and dispenses the measured quantities of pharmaceuticals 410 received from the filling cabinet 402 into containers 304 on the pallet 302 while the pallet is positioned in the pallet system 406. The pallet conveyor 408 can transport the pallets through some or all of the devices within the pharmacy fulfillment device 112 (shown in FIG. 2).

As discussed in further detail below, in operation, the pallet conveyor 408 automatically brings a pallet 302 with one or more containers 304 to the pallet system 406. The pallet system 406 automatically guides the pallet 302 to a location directly beneath the prefill assembly 404 so that the measured quantity of pharmaceuticals 410 can be dispensed into one of the containers 304 found on the pallet 302. This process can be repeated to dispense multiple measured quantities of the same or different pharmaceuticals 410 into different containers 304 on the pallet 302. The pallet conveyor 408 may be a chain conveyor or a belt driven conveyor, e.g., a belted Bosch TS2 belt-driven conveyor. In some embodiments, the pallet conveyor 408 is a low friction, high speed conveyor. Although pallets are generally described herein as employed to move a group of containers 304 through the system 100 or within the automated dispensing device 212, trays or other types of carriers and any suitable type of container management system may be employed to individually or as a group move the containers 304 through the system 100 or within the automated dispensing device 212.

In the exemplary embodiment, the filling cabinet 402 is physically adjacent to the prefill assembly 404, and the prefill assembly 404 is physically located directly above the pallet system 406. For example, the filling cabinet 402 and prefill assembly 404 may be located on a second floor (e.g., in a building), and the pallet system 406 may be located on a first floor below the second floor. These components of the automated dispensing device 212 may be otherwise positioned, e.g., in a position to utilize gravity to move pharmaceuticals 410 from the filling cabinet 402 to the prefill assembly 404 and then to the containers 304 on the pallet 302. For example, some portion of the filling cabinet 402 may extend below the second floor.

In the exemplary embodiment, the filling cabinet 402 includes multiple cells 412 arranged in a grid-like pattern with a plurality of columns and a plurality of rows. Specifically, in the exemplary embodiment, the filling cabinet 402 has ten columns and nine rows for a total of ninety cells 412. In some embodiments, the filling cabinet 402 has either more or fewer rows and/or columns of cells 412. The various cells 412 may each be adapted to similar or different pharmaceuticals 410, e.g., pills, tablets, or capsules. For example, in some embodiments, a commonly prescribed pharmaceutical 410 may occupy more than one cell 412. The cells 412 are be adapted to receive inserts 414 which can hold the pharmaceuticals 410 then automatically dispense the pharmaceuticals 410 into the prefill assembly 404. Dispensing can include counting each pharmaceutical item, staging the counted group of a plurality of pharmaceutical items and then release the group of items into the appropriate container. In the exemplary embodiment, the inserts 414 can be pulled out of the cells 412 like drawers. In other embodiments, the inserts 416 may be permanently located in the cells 412. In the exemplary embodiment, only a single filling cabinet 402 with a single prefill assembly 404 is shown. However, in some embodiments, two opposing filing cabinets 402 and two opposing prefill assemblies 404 may be positioned over the same pallet system 404.

In the exemplary embodiment, each insert 414 has a face plate with a door which must be unlocked to open. The door may be adapted to unlock pursuant to a process that mitigates risk of unauthorized access to the pharmaceuticals 410 within the insert 414 and/or to mitigate risks that unintended pharmaceuticals 410 will be added to the insert 414. For example, in the exemplary embodiment, the door of each cell 412 will unlock when identifying information associated with a pharmaceutical container is detected (e.g., by a pharmacist using a hand-held scanning device to read a bar code or other computer-readable element on the pharmaceutical container) that matches identifying information associated with the cell 412 (e.g., by a pharmacist using a hand-held scanning device to read a bar code or other computer-readable element on the face plate of the insert 414) and information about the pharmacist who fills the cell 412 (e.g., by a pharmacist using a hand-held scanning device to read a bar code or other computer-readable element on the pharmacist's badge). The inserts 414 may be otherwise accessed to receive pharmaceuticals 410 to be held and dispensed.

Referring now to FIG. 6, each cell 412 has a pill counter with an output which feeds the pharmaceuticals (e.g., a plurality of the same item) contained therein into the prefill assembly 404. The feeding includes a specific count of pharmaceutical items being released from the cell. The prefill assembly 404 includes a plurality of doors 416 (one being shown), each of which includes a guiding system for guiding the pharmaceuticals dispensed from the respective cells 412 into the appropriate containers 304 on the pallet 302 in the pallet system 406. The doors 416 can be slid horizontally away from the filling cabinet 402 for maintenance either while the automated dispensing device 212 is in operation or shut down. A door slide 460 is fixed to the support structure of either the prefill assembly 404 or the filing cabinet 402. The door slide 460 will allow the door to move between its dispensing position under the filling cabinet 402 and a maintenance position laterally moved from under the filling cabinet 402. The movement of the door on slide 460 can be in the direction of arrow 461 shown in FIG. 6. The filling cabinet 402 is configured such that the cell 412 will not dispense pharmaceuticals 410 (shown in FIG. 8) when the door 416 aligned that cell 412 is out of position, such as during maintenance with the door not in its dispensing position.

Figure 9:
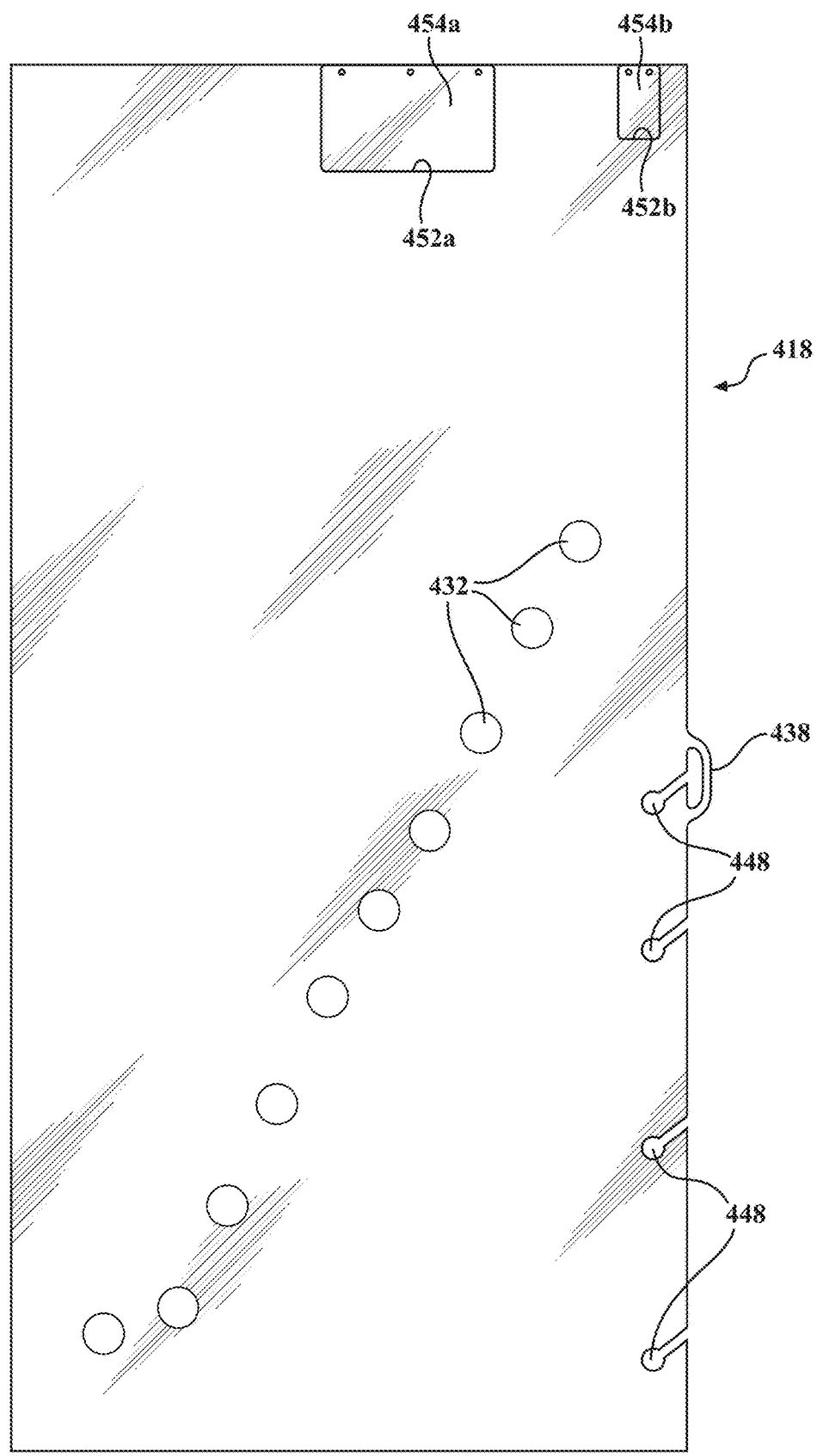
FIG. 9 is a front elevation view of a panel that may be deployed within the prefill assembly of FIG. 7.

The door 416 defines a generally hollow cuboid shape of planar size panels. The door 416 includes a first panel 418 (reference number shown in FIG. 9) and a second panel (not numbered) which are both generally rectangular in shape and which are both made out of a transparent material, such as plexiglass, polymer glass or the like. The first and second panels are spaced from each other to define an interstice and generally mirror each other. The first and second panels additionally define the largest area of the door and in use extend in the Y and X directions (height and depth). The top, bottom and ends of the door 416 are defined by a transparent panel which have less areas than the first panel or the second panel. A plurality of guiding members 420 are disposed between the first panel 418 and the second panel in the hollow interior of the door 416 and to define a plurality of chutes 424, 426 which guide the pharmaceuticals 410 dispensed by the cells 412 into the appropriate containers 304 being held in the pallet system 406. The guiding members can include a slide on which the pharmaceutical items can slide under the force of gravity or a tube in which pharmaceutical items can slide under the force of gravity. The pallet system 406 is configured such that any of the containers 304 located on the pallet 302 can be aligned with any of the chutes 424, 426. Thus, the pharmaceutical 410 or group of pharmaceutical items contained in any of the cells 412 in the filling cabinet 402 can be dispensed into any of one of the containers on the pallet 302. In the exemplary embodiment, guiding members 420 are only fixedly attached with the second panel so that the first panel 418 can be removed from the door 416, such as during maintenance, without the guiding members 420 falling out of their respective positions. The guiding members 420 may be fixedly attached to the second panel through any suitable attachment means, such as fasteners, bolts, screws or the like.

Each chute 424, 426 has a first portion 424 which extends at a downward angle away from the associated cell 412 and a second portion 426 which extends vertically downwardly from the first portion 424 towards the pallet system 406. The lengths of both the first and second portions 424, 426 of the chutes 424, 426 sequentially increase from the chute 424, 426 associated with the lowermost cell 412 in any column to the chute 424, 426 associated with the uppermost cell 412.

Figure 7:
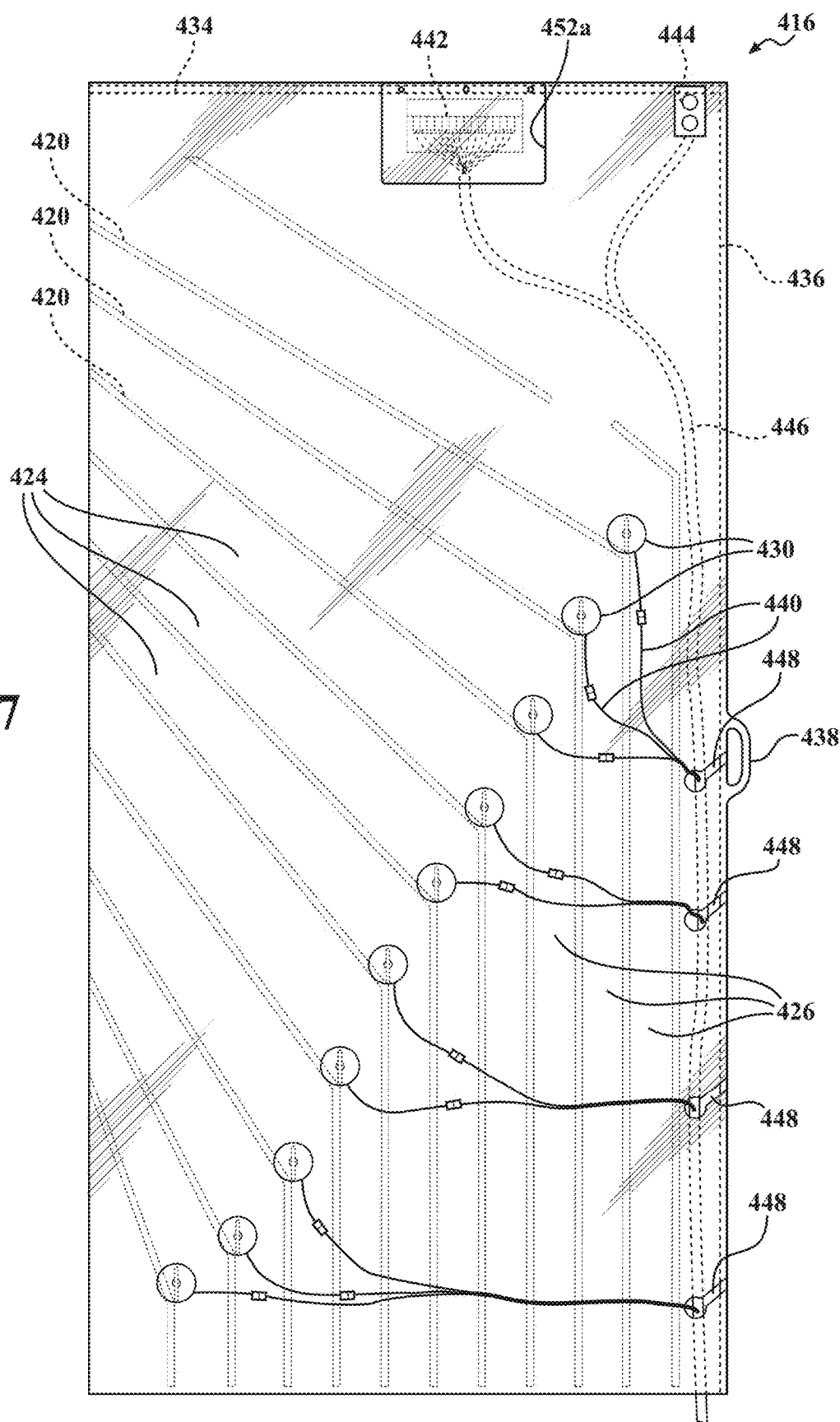
FIG. 7 is a front elevation view of a prefill assembly that may be deployed within the automated dispensing device of FIG. 4.
Figure 8:
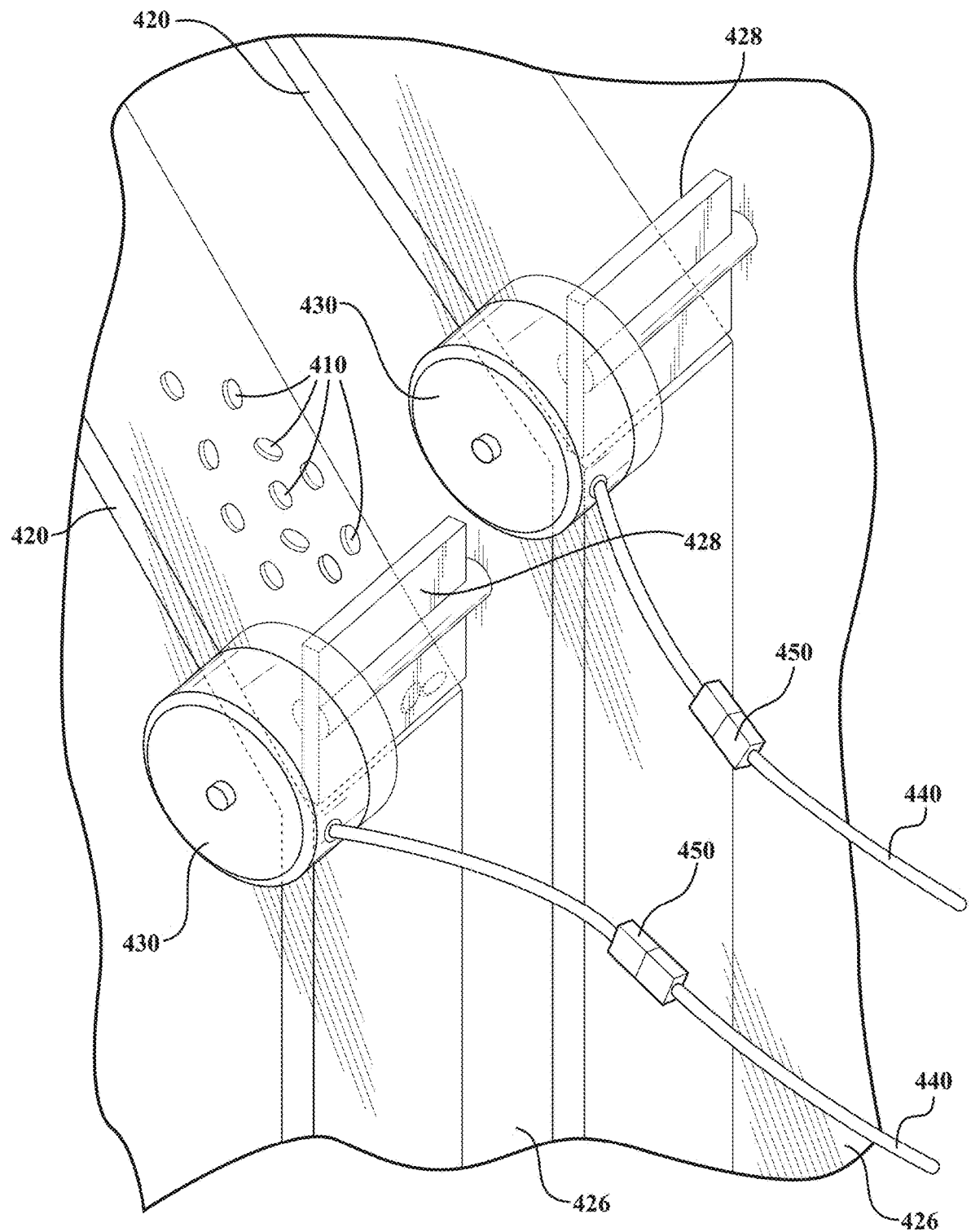
FIG. 8 is an enlarged view of a portion of FIG. 7 and illustrating a plurality of pills within the prefill assembly.

As shown in FIGS. 7 and 8, in the exemplary embodiment, for each chute 424, 426, a guidance control device in the form of a gate 428 is positioned where the first portion 424 meets the second portion 426. In some embodiments, the gate 428 may be positioned at other locations along the first portion 424. The gate 428 can be selectively closed to restrict the passage of pharmaceuticals 410 and opened to allow the pharmaceuticals 410 to drop through the second portion 426 and into the container 304 (shown in FIG. 6). The gate 428 allows the pharmaceuticals 410 to be staged or prepped prior to the container 304 reaching the correct location directly beneath the second portion 426 of the chute 424, 426. In other words, during operation, while a selected container 304 to receive a particular medication from one of the cells 412 is travelling on the pallet conveyor 408 to the location below the associated chute 424, 426, the cell 412 can count and release a measured quantity of a desired pharmaceutical 410 to the chute 424, 426. The measured quantity of pharmaceuticals 410 can then sit against the gate 428 while it is in the closed position until the container 304 is in the correct location. Only then does the gate 428 automatically opens to allow the staged pharmaceuticals 410 to fall through the second portion 426 of the chute 424, 426 and into the container 304. This allows for reduced time between when the container 304 arrives in the correct location below the chute 424, 426 and when the measured quantity of pharmaceuticals 410 is dispensed into the container 304. The gate 428 opens on command from controller, which can send an electrical open signal to the normally closed gate when it determines that the specific container is positioned beneath the chute.

In some embodiments, one or more of the chutes 424, 426 may include a plurality of gates 428 for staging more than one measured quantity of pharmaceuticals 410. For example, a first measured quantity of pharmaceuticals 410 may be captured in the chute 424, 426 by one gate 428, and a second measured quantity of pharmaceuticals 410 may be captured in the chute 424, 426 by another gate 428. Additional gates 428 may also be included to capture additional measured quantities of pharmaceuticals 410 dispensed by the cells 412 prior to the containers 304 reaching the pallet system 406.

The gates 428 are opened and closed by respective electronic servo motors 430 which can rotate the gate 428 between the open and closed positions upon receipt of an energizing open signal from the controller. The gates 428 are attached with the first panel 418, which has a plurality of openings 432 for allowing the servo motors 430 to operably attach with the respective gates 428 in the chutes 424, 426. The prefill assembly 404 may also include other electronic components (such as, for example, sensors) in addition to the servo motors 430. In an example embodiment, the motors 430 are positioned outside the panel of the door and extend into the interior of the door to engage the control flap within the door and in the path defined by the chute.

The door 416 further includes a top wall 434 and a side wall 436 which both extend between and along respective edges of the first panel 418 and the second panel. The top and side wall have a same width dimension. A handle 438 is affixed with an outer surface of the side wall 436 for allowing a user to manually pull the door 416 away from the filling cabinet 402 on a slide 460 during maintenance. In other embodiments, the door 416 is configured to move towards and away from the filling cabinet 402 through automatic means (such as electric, pneumatic, or hydraulic actuators) or through other manual means.

The servo motors 430 are all in electronic communication with a controller (not shown) via a plurality of wires 440. Each wire 440 extends from a wire box 442, which is in electrical communication with the controller, or a power source 444. The wire box 442 and power source 444 are both positioned adjacent an upper end of the door 416, and the wires 440 extend downwardly therefrom to the respective servo motors 430 for both powering the servo motors 430 and for allowing the controller to control the opening and closing of the gates 428 during operation of the automated dispensing device 212. In an example embodiment, the controller is part of the wire box. Adjacent the power source 444 and the wire box 442, the wires 440 are bundled together in a conduit 446 which runs along a side of the door 416. The wires 440 break off from the conduit 446 at differing locations to individually electrically attach with the servo motors 430.

The conduit 446 extends downwardly within the door 416 along a channel between the side wall 436 and a nearest one of the guiding members 420. Thus, the conduit 446 is not easily accessible when the first panel 418 is secured with the second panel, which reduces the risk of the conduit 446 being snagged or unintentionally pulled out of position. The individual wires 440 branch out of the conduit 446 and extend through a plurality of wire openings 448 formed into the first panel 418 of the door 416. Each wire 440 has a quick-connect coupling 450 in the area between the wire opening 448 and the servo motor 430. Thus, a user can easily disconnect the servo motor 430 from the wire 440, replace the servo motor 430, and attach a replacement servo motor 430 (or the same servo motor 430 after repair) to the same wire 440 without any manipulation of any of the other wires 440 in the door 416. This configuration reduces down time of the door 416, and thus the dispensing of the pharmaceuticals 410 contained in the cells 412 associated with that door 416, during maintenance.

In the exemplary embodiment, each of the wire openings 448 has a keyhole shape with a circular portion through which the wires 440 extend and a slot portion which extends to a side edge of the first panel 418 toward the side edge panel. The slot portion makes it easier for a user to guide the wires 440 into and out of the circular portion when the first panel 418 is being attached with or detached from the door 416 by allowing the wires 440 to be slid into or out of the appropriate wire openings 448 from the side edge of the first panel 418. In the exemplary embodiment, the first panel 418 has four total wire openings 448 and nine servo motors 430. Thus, some of the wire openings 448 have multiple wires 440 extending therethrough. In other embodiments, the first panel 418 may have either more or fewer wire openings 448 and any number of wires 440 can extend through each of those wire openings 448. The slot portion of the opening 448 may extend around the joint of the first panel into the edge panel. The slot portion of the opening 448 further extends upwardly from the circular portion at an angle greater than zero and less than a right angle. In an example embodiment, the angle of the slot portion in the range of about fifteen degrees to sixty degrees, twenty degrees to fifty degrees, or thirty to forty-five degrees. In an example embodiment, the angle is about 45 degrees, +/−5.0 or 2.0 degrees.

In the exemplary embodiment, the first panel 418 further includes a pair of spaced apart cutouts 452a, 452b which both extend downwardly from an upper edge of the first panel 418 and which align with the wire box 442 and the power source 444. The openings formed by these cutouts 452a, 452b are closed by secondary panels 454a, 454b which are attached with the top wall 434 of the door 416 separately from the first panel 418 through fasteners in a removable manner. Thus, a user can easily remove either or both of the secondary panels 454a, 454b to gain access either the wire box 442 or the power source 444 by removing the appropriate secondary panel 454a, 454b without removing the first panel 418 from the door 416. In some embodiments, the door 416 may not have secondary panels 454a, 454b or other attachment means can be provided to fixedly attach the secondary panels 454a, 454b with the door 416.

The present description discloses using the present structure and methods to dispense medications in a solid, individual form factor, e.g., a pill, a capsule, a tablet, a gel cap or the like. In additional embodiments, the structures and methods can be used with other individual items, e.g., seeds, candy, gum or the like, which are dispensed through a counter or by weight through a staging device like the door described herein. The individual items are singulated, with a dry exterior so they can traverse through the door under the force of gravity to fall from the source, e.g., a counter or scale, through stages in the door to a container.

The present description uses electronic guidance devices within the door to control the staging of items, e.g., medications. In an example embodiment, the guidance devices can be pneumatically controlled devices with hoses to supply a fluid, e.g., air or gas, to actuate the guidance devices to stage the items for release into a container. The hoses could extend through apertures in the door in place of the electrical wires and lines. The electronic controller for the electrical devices, in this example, includes a plurality of pneumatic valves that control the flow of fluid to the pneumatically controlled guidance devices.

Obviously, many modifications and variations of the present invention are possible in light of the above teachings and may be practiced otherwise than as specifically described while within the scope of the appended claims. Additionally, it is to be understood that all features of all claims and all embodiments can be combined with each other as long as they do not contradict each other.

What is claimed is:

1. A medication dispensing assembly, comprising:
a prefill assembly for directing medications from a plurality of medication dispensers into a plurality of containers;
said prefill assembly including at least one hollow door with an interior and with a panel which closes off at least a portion of one side of said interior;
said at least one hollow door including a plurality of guiding members which separate said interior into a plurality of chutes which extend vertically downwardly towards a bottom of the at least one hollow door;
the plurality of chutes including electronically activated gates which can selectively close to restrict the passage of medications through the plurality of chutes or open to allow the passage of medications through the plurality of chutes from the plurality of medication dispensers to the plurality of containers; and
a plurality of wires extending through at least a portion of one of the plurality of chutes, and the plurality of wires extending out of said interior of the at least one hollow door through wire openings in said panel and being electrically connected with said electronically activated gates.

2. The medication dispensing assembly as set forth in claim 1 wherein said plurality of wires extending through at least a portion of the one of the plurality of chutes are bundled together in a conduit.

3. The medication dispensing assembly as set forth in claim 2 wherein at least one of said wire openings includes a slot which extends to an edge of said panel.

4. The medication dispensing assembly as set forth in claim 3 wherein each of said wire openings has a keyhole shape with a circular portion and a slot which extends to said edge of said panel.

5. The medication dispensing assembly as set forth in claim 1 wherein said panel includes at least one cutout for allowing access to one or more components within said housing.

6. The medication dispensing assembly as set forth in claim 1, further comprising:
a door slide fixed to a support structure of the prefill assembly, the door slide configured to allow the at least one hollow door to move between a first dispensing position under the plurality of medication dispensers and a maintenance position;
wherein the at least one hollow door is further configured to move along the door slide.

7. The medication dispensing assembly of claim 6, wherein the door slide comprises a horizontal track; and
wherein the at least one hollow door is configured to move along the door slide by sliding laterally along the horizontal track.

8. The medication dispensing assembly as set forth in claim 1, wherein the plurality of wires extend along a length inside of the at least one hollow door; and
wherein the wire openings include at least one of the wires extending through each of the wire openings.

9. The medication dispensing assembly as set forth in claim 1, further comprising:
  a filling cabinet comprising a plurality of cells arranged in a grid-like pattern with a plurality of columns and a plurality of rows, each of the cells being adapted to receive inserts to hold pharmaceutical items, the plurality of medication dispensers comprising the plurality of cells;
  wherein the filling cabinet is adapted to dispense measured quantities of pharmaceuticals into the prefill assembly.

10. The medication dispensing assembly as set forth in claim 9, wherein the at least one hollow door is further adapted to be moved away from the filling cabinet.

11. The medication dispensing assembly as set forth in claim 1, wherein the prefill assembly includes a plurality of hollow doors; and
  wherein the plurality of hollow doors includes the at least one hollow door.

12. A method for using a medication dispensing assembly, the method comprising:
  directing medications from a plurality of medication dispensers to a plurality of containers, via a prefill assembly including at least one hollow door, by:
    guiding the medications to the plurality of containers, via a plurality of guiding members separating an interior of the at least one hollow door into a plurality of chutes extending vertically downwardly towards a bottom of the at least one hollow door;
    operating electronically activated gates of the plurality of chutes to selectively close or open the plurality of chutes, by a controller electrically connected to the electronically activated gates via a plurality of wires extending through at least a portion of one of the plurality of chutes, the plurality of wires extending out of the interior of the at least one hollow door through wire openings in the panel; and
    restricting or allowing passage of the medications through the plurality of chutes from the plurality of medication dispensers into the plurality of containers, based on operating the electronically activated gates.

13. The method of claim 12, further comprising:
  dispensing measured quantities of pharmaceuticals into the prefill assembly, via a filling cabinet physically adjacent to the prefill assembly, the filling cabinet including the medication dispensers; and
  directing the measured quantities to the plurality of containers, via the prefill assembly, wherein the medications comprise the measured quantities.

14. The method of claim 13, further comprising:
  receiving inserts containing the measured quantities of pharmaceuticals, via the medication dispensers; and
  automatically dispensing the measured quantities into the prefill assembly, based on receiving the inserts.

15. The method of claim 12, further comprising:
  dispensing a subset of the medications, by:
    counting each pharmaceutical item of the subset by one of the plurality of medication dispensers, to create a counted group; and
    operating the electronically activated gates to:
      stage the counted group prior to release into one of the plurality of containers; and
      after staging, release the counted group into one of the plurality of containers.

16. The method of claim 12, further comprising:
  counting pharmaceutical items using a pill counter of one of the plurality of medication dispensers, to generate counted pharmaceutical items; and
  feeding the counted pharmaceutical items into the prefill assembly via an output of the pill counter, wherein the medications comprise the counted pharmaceutical items.

17. The method of claim 12, further comprising:
  staging a counted group of pharmaceutical items prior to directing the counted group into one of the plurality of containers, by:
    releasing the counted group into one of the plurality of chutes associated with the one of the plurality of containers, the one of the plurality of chutes including a closed one of the electronically activated gates; and
    permitting the counted group to sit against the closed one of the electronically activated gates, to create a staged counted group.

18. The method of claim 17, further comprising:
  determining that the one of the plurality of containers has reached a dispensing location associated with the one of the plurality of chutes;
  automatically opening the closed one of the electronically activated gates, by the controller via the plurality of wires, in response to reaching the dispensing location, wherein operating electronically activated gates comprises automatically opening the closed one; and
  allowing the staged counted group to fall through a remainder of the one of the plurality of chutes and into the one of the plurality of containers, wherein restricting or allowing passage of the medications through the plurality of chutes comprises allowing the staged counted group to fall into the one of the plurality of containers.

19. The method of claim 17, further comprising:
  staging a second counted group of pharmaceutical items prior to directing the counted group and the second counted group into the plurality of containers, by:
    releasing the second counted group into a second one of the plurality of chutes associated with a second one of the plurality of containers, the second one of the plurality of chutes including a second closed one of the electronically activated gates;
    permitting the counted group to sit against the closed one of the electronically activated gates, to create a staged counted group; and
    permitting the second counted group to sit against the second closed one of the electronically activated gates, to create a second staged counted group.

20. The method of claim 19, further comprising:
  determining dispensing positioning of a first container and a second container, by the controller, the dispensing positioning indicating the first container is positioned beneath the one of the plurality of chutes and the second container is positioned beneath the second one of the plurality of chutes, wherein the one of the plurality of containers comprises the first container, and wherein the second one of the plurality of containers comprises the second container; and
  in response to determining the dispensing positioning, sending an electrical open signal to the closed one and the second closed one of the electronically activated gates, by the controller via the plurality of wires.

* * * * *